United States Patent [19]

Badenhop et al.

[11] Patent Number: 4,737,286
[45] Date of Patent: Apr. 12, 1988

[54] MICROFILTRATION MEMBRANE FILTER

[75] Inventors: Charles T. Badenhop; Joachim Fischer, both of Bad Kreuznach, Fed. Rep. of Germany

[73] Assignee: Seitz Filter Werke Theo & Geo Seitz GmbH & Co., Bad Kreuznach, Fed. Rep. of Germany

[21] Appl. No.: 798,601

[22] Filed: Nov. 15, 1985

Related U.S. Application Data

[63] Continuation-in-part of Ser. No. 499,379, May 31, 1983, Pat. No. 4,567,009.

[30] Foreign Application Priority Data

May 29, 1982 [DE] Fed. Rep. of Germany ....... 3220376

[51] Int. Cl.$^4$ .............................................. B01D 39/16
[52] U.S. Cl. ............................ 210/500.33; 210/500.38
[58] Field of Search .................... 55/158; 210/500.28, 210/500.33, 500.38; 428/220

[56] References Cited

U.S. PATENT DOCUMENTS

| | | | |
|---|---|---|---|
| 3,408,315 | 10/1968 | Paine | 264/49 |
| 3,567,632 | 3/1971 | Richter et al. | 210/500.33 X |
| 3,878,109 | 4/1975 | Ikeda et al. | 210/500.33 X |
| 3,899,309 | 8/1975 | Hoehn et al. | 210/500.28 X |
| 4,229,291 | 10/1980 | Walch et al. | 210/646 |
| 4,233,434 | 11/1980 | Kraus et al. | 210/500.38 X |
| 4,340,479 | 7/1982 | Pall | 210/500.38 X |

FOREIGN PATENT DOCUMENTS

| | | |
|---|---|---|
| 36315 | 9/1981 | European Pat. Off. . |
| 2642979 | 3/1978 | Fed. Rep. of Germany . |

Primary Examiner—Richard V. Fisher
Assistant Examiner—W. Gary Jones
Attorney, Agent, or Firm—Karl F. Ross; Herbert Dubno

[57] ABSTRACT

A microfiltration membrane is made up dissolving m-phenylenediamine-isophthalic acid polymer, a high temperature aromatic polyamide, in one or more solvents selected from the group which consists of N-methylpyrrolidone, dimethylformamide and dimethylacetamide, and the resulting solution in the presence of two or more of these solvents, a structure-loosening agent such as water or a polyhydric alcohol, is cast. After gel formation in the film the latter is washed free from solvents and dried. The microfiltration membrane has high bursting strength and a pore point of 0.05 to 10 microns and a high permeability.

4 Claims, 6 Drawing Sheets

MICROFILTRATION MEMBRANE FILTER

CROSS REFERENCE TO RELATED APPLICATION

This application is a continuation-in-part of Ser. No. 499,379 filed 31 May 1983, now U.S. Pat. No. 4,567,009.

FIELD OF THE INVENTION

Our present invention relates to a membrane filter for microfiltration and, more particularly, to a microfiltration membrane which is composed in whole or in part of synthetic resin material.

BACKGROUND OF THE INVENTION

A microfiltration filter generally has a membrane with a pore size or diameter between about 0.05 microns and about 10 microns ($\mu$m) and which may be composed of synthetic resin materials.

Microfiltration membranes have been proposed in a variety of forms and can be constituted, according to the art, from various compositions. For example, mention may be made of cellulose esters, polysulfones, (European patent application No. 81 - 301 074/003 63 15) polyvinylchloride (PVC), aliphatic polyamides (U.S. Pat. No. 3,408,315 or the like.

While these materials have been found to be effective for many microfiltration processes and in membrane filters for use on a small scale and have limited applications, they generally have characteristics which have limited their wide-spread industrial use. For example, they may have limited chemical resistance, i.e. resistance to attack by corrosive substances, they may have poor resistance to moisture, and may have poor mechanical properties such as tearing strength and bending strength.

Strength problems in filters have been attacked by providing membranes which are composed of aromatic polyamides (German patent document DE-OS No. 26 42 979 and U.S. Pat. No. 4,229,291), although these membrane filters do not have a pore size in the range of about 0.05 microns to about 10 microns and are not suitable for use in microfiltration. Indeed, as far as we are aware, it has not been possible heretofore to provide such membrane filters suitable for microfiltration.

OBJECTS OF THE INVENTION

It is, therefore, an object of the present invention to provide an improved membrane suitable for microfiltration which avoids disadvantages of other membranes used for microfiltration and yet has mechanical advantages similar to those which could not heretofore have been used effectively for microfiltration.

A more specific object of the invention is to provide an improved membrane filter for microfiltration, i.e. having a pore size of between 0.05 microns and 10 microns, with excellent chemical resistance, moisture resistance and mechanical properties such as bending strength and tearing strength.

SUMMARY OF THE INVENTION

These objects and others which will become apparent herein after are attained, in accordance with the present invention which is based upon our surprising discovery that the aforementioned requirements for a microfiltration membrane can be obtained when the membrane filter is composed of an aromatic polyamide with a pore size in the range of about 0.05 microns to about 10 microns. Such a filter has excellent resistance to many chemicals considered corrosive to microfiltration membranes heretofore and has an exceptional resistance to attack by most hydrocarbons and many other organic solvents. The microfiltration membrane is also resistant to attack by common acids and alkalies during filtration under normal conditions, e.g. room temperature. A further advantage of the membrane is its resistance to moisture which far exceeds that of microfiltration membrane filters hitherto known and used.

We have found that best results can be obtained by forming the filter membrane from high-temperature-resistant practically nonmeltable aromatic polyamides having a pore size between about 0.1 microns and about 10 microns and especially when the microfiltration membrane is composed of a copolymer of m-phenylenediamine and isophthalic acid. The thickness of the microfilter membrane of the invention should be between 0.05 mm and 0.15 mm.

The present invention also involves a new method of making microfiltration membranes which in itself represents an advance over the art. In earlier methods of forming a membrane, a solution or a dispersion of the synthetic resin intended to form the microfiltration membrane was deposited on a smooth comparatively dense and chemically inert surface in a predetermined layer thickness under carefully selected environmental conditions, especially atmospheric moisture content or relative humidity. The solvent was then driven off from this layer and, when the gelling material had sufficient strength, it was stripped from the surface.

According to the invention, a high-temperature-resistant practically nonmeltable aromatic polyamide is used as the starting material and is dissolved in a solution of dimethylacetamide, dimethylformamide and/or N-methylpyrrolidone.

Upon formation of a solution of the aromatic polyamide in at least two of these three solvents, with no one solvent making up more than 80% of the mixture, one or more structure-loosening additives are supplied to the solvent mixture as well as any additional solvent required to dilute the mixture to the desired viscosity. The solvent mixture is then stirred and agitated intensively for homogenization.

The homogeneous mixture is then spread in the desired thickness of the finished microfiltration membrane under climatically controlled conditions with a relative humidity between 50 and 90% and selected to insure the formation of the desired pore size of the membrane and, after gelling the solvent is removed from the layer by repeated washings in water.

This unique approach to fabricating a microfiltration membrane gives rise to a number of significant advantages.

Firstly, it allows the use of aromatic polyamides which are practically nonmeltable and are scarcely soluble in most solvents. It is indeed surprising to find that such aromatic polyamide can be solubilized to the extent necessary for the purposes of the invention in the three solvents, namely, dimethylacetamide and dimethylformamide and N-methylpyrrolidone although to a somewhat lesser extent using the latter.

Indeed, we have found that when a membrane is made from an aromatic polyamide with only one of these solvents and the structure-loosening additive is then introduced, the membranes are unsatisfactory because although the membrane has a high bubble point, it is practically nonpermeable or, conversely, may have high permeability with an unacceptably low bubble point. The bubble point is a measure of the structural stability of the membrane.

Thus it is indeed surprising that these results do not obtain when the solution is formed from two out of the three mentioned solvents. The use of the two solvents, at least, permits excellent permeability with a satisfactory bubble point to be obtained. This is especially true when no one of these solvents is present in an amount in excess of 80% of the solvent mixture.

It has also been found, most surprisingly, that the pore size of the filter membranes of aromatic polyamide of the invention is no longer determined by the precipitating agent, as is generally the case, but rather by the mixing ratio of the various individual solutions formed by the respective solvents in the mixture while the structure-loosening additive only has a secondary effect on the pore size.

Finally, it has been noted that for reproducible formation of filter membranes with the desired pore size, it is only necessary to operate with sufficiently high moisture content and to maintain this moisture content or relative humidity for the successively formed membranes in the range of 50 to 90% relative humidity.

The preferred solvent moisture consists of dimethylacetamide and dimethylformamide with a ratio of the dimethylacetamide solution to the dimethylformamide solution between 1:4 and 4:1. Of course, the N-methylpyrrolidone can also be introduced into the solution although it is preferable that the first two components make up at least half of any ternary solvent system which may be used.

When the solvent system consists of dimethylacetamide and N-methylpyrrolidone, the former should make up at least 50% of the solvent mixture and when the solvent system consists of a combination of dimethylformamide and N-methylpyrrolidone, again the former should make up more than 50% of the solvent system.

In the practice of the process of the invention, respective solutions of the aromatic polyamide in each of the solvents to form the system can be combined and at least one of these solvent can be employed as a vehicle for adding the aromatic polyamide to the system. The components are then mixed in the appropriate ratio to achieve the desired proportions of the two or three solvents.

It is also possible in carrying out the process of the invention and in many cases is advantageous with respect to the solution of the particular pore size, to first form the solvent mixture by combining the two or more solvent components in the appropriate proportions and then to dissolve the aromatic polyamide in this solvent mixture.

We have already pointed out that the preferred aromatic polyamide is a copolymer of m-phenylenediamine and isophthalic acid This copolymer can be dissolved under specified conditions, e.g. by the addition of alkali metal chloride or an alkaline-earth metal chloride to the system consisting of the aromatic polyamide and one or more of the three solvents, namely, the N-methylpyrrolidone, dimethylacetamide and dimethylformamide.

The preferred additive is lithium chloride.

To dissolve the aromatic polyamide, a high mixing velocity is required and considerable mixing energy must be expended to break up the crystal structure. Even under such high energy mixing conditions, the time which is required to dissolve the aromatic polyamide is considerable since solubilization can be seen to begin only after intensive mixing, for say three hours.

The solution formed by dissolving the aromatic polyamide in the solvent system or one of the solvents thereof followed by formation of the solvent system and after addition of the structure-loosening additive can then have its viscosity adjusted by the addition of a further quantity of solvent. The final solution is then cast on a flat, planar or other smooth surface, preferably a plate or a polished metal surface to form a layer of the desired thickness for the particular membrane. The atmosphere in the region of the surface upon which the layer is cast is maintained at a relative humidity of 50 to 90%. Apparently this relative humidity causes the aromatic polyamide to precipitate from the solvent and gel as a film, which can be withdrawn while still moist with the solvent from the substrate and washed in a succession of water baths free from the solvent. The thickness of the finished dried product should be between 0.05 mm and 0.15 mm.

The structure-loosening additive can be a polyhydric alcohol, for example, ethyleneglycol or polyethyleneglycol 400 and water which are effective even in very small proportions. The quantity of water can be combined with one or more of the polyhydric alcohols and added to the mixture or, to one or more of the solvents to be used in the mixture or preferably to the solvent or solvent system which is used to dissolve the polyamide solution to prevent irreversible precipitation.

As noted, the fineness of the membrane is greatly dependent on the prevalent relative humidity which at room temperature should always be kept between 50% and 90%.

The proportion of aromatic polyamide in the mixture to be cast can be between 6 and 12% by weight, the alkali chloride or alkaline-earth chloride (preferably lithium chloride and/or calcium chloride) should be substantially two to six parts by weight and the structure-loosening additive can be present in an amount between 10 and 25 parts by weight while the water is present in an amount between one and four parts by weight with the solvent system making up 65 to 75 parts by weight for 100 parts by weight if the mixture.

It is important to recall that the formation of a solvent mixture is vital to the present invention. For example, when an aromatic polyamide dissolved in dimethylformamide only is used to form a membrane with the addition of a structure-loosening additive, the membrane is entirely unsatisfactory with respect to its permeability although it does have a high bubble point. When under otherwise identical conditions dimethylacetamide is used as the solvent, the membrane which results is again completely unsatisfactory, this time because it also has a low bubble point. When N-methylpolypyrrolidone is substituted as the solvent, both low permeability and low bubble point characterize the membrane which results.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
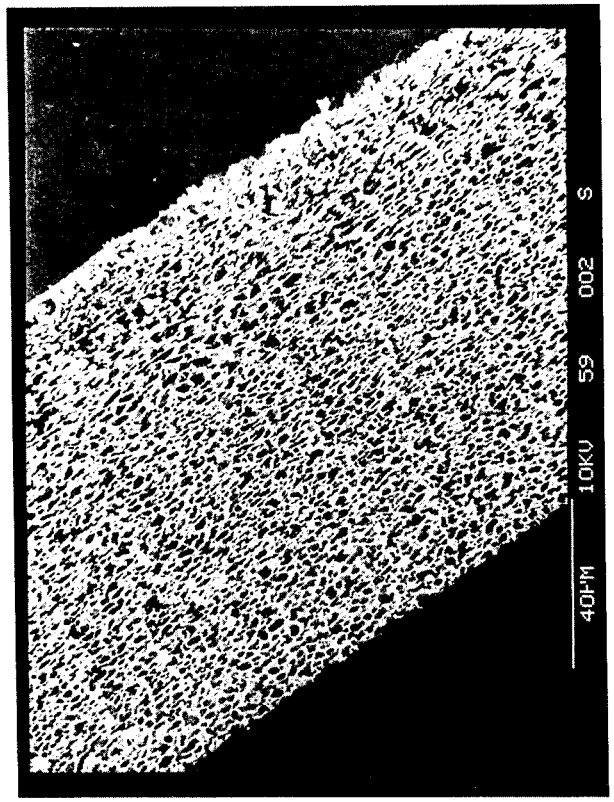
FIG. 1 is a raster electron microscopic photograph of an edge section of a membrane according to the invention, with the upper side of the membrane at the right hand side of the picture.
Figure 2:
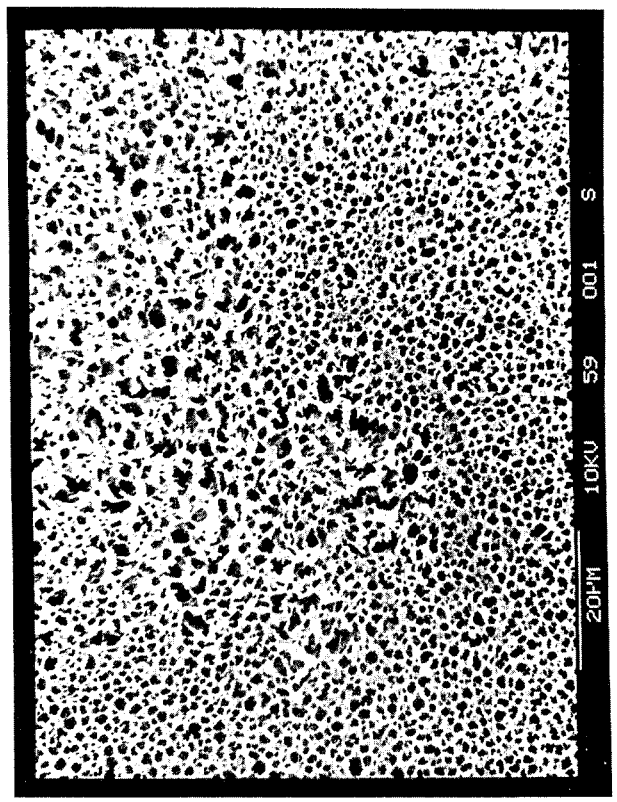
FIG. 2 is an electron microscopic photograph of the underside of the membrane according to FIG. 1.
Figure 3:
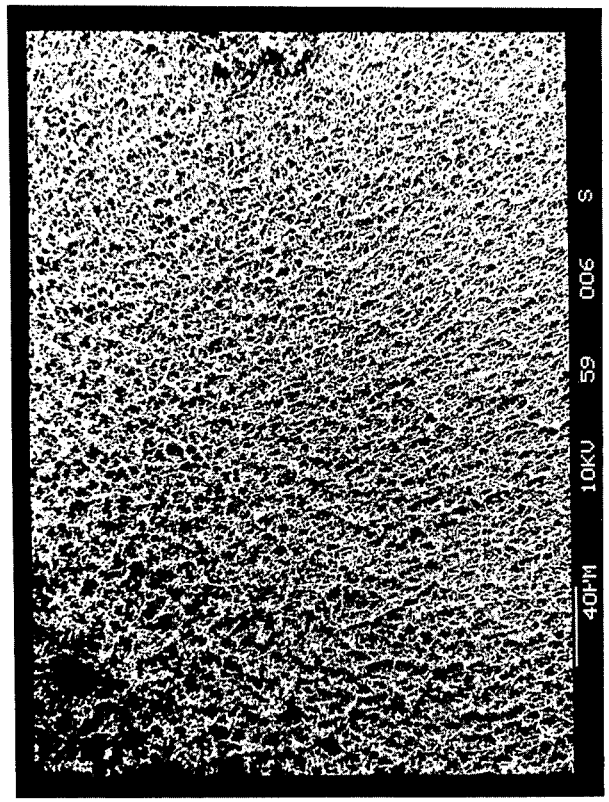
FIG. 3 is an electron microscopic photograph of the upper side of the membrane according to FIG. 1.

In the FIGS. 1 to 3 of the drawing, a filter membrane made of a copolymer of m-phenylenediamine and isophthalic acid is shown by raster electron microscopic photographs showing an edge section of the membrane and the underside of the membrane and the upper side of the membrane respectively. The membrane shown by the FIGS. 1 to 3 is characterized by an inner porous structure, which is uniform throughout having open pores and a pore diameter between 0.05 microns and 10 microns. The open porous structure extends practically uniformly and without changement in the structure and pore size over the entire thickness of the membrane from the upper side surface to the underside surface of the membrane. As shown by FIGS. 2 and 3, pore openings having more or less clearly encircled or bordered opening faces are formed in the underside surface of the membrane and in the upper side surface of the membrane. Such pore openings are in size unrestricted with respect to the pore diameter in the inner structure of the membrane. As may be seen by comparing FIGS. 2 and 3, the shape and arrangement of the pore openings in the underside surface of the membrane is somewhat different from the pore opening shape and arrangement in the upper side surface of the membrane. This is due to the method used for making the membrane such that the membrane is given a somewhat smoother surface at its underside and a somewhat rougher surface at its upper side. Nevertheless there is a practically unrestricted inlet to the open pores of the inner structure of the membrane and an unrestricted outlet from the open pores in the inner structure of the membrane. By such unrestricted inlet and unrestricted outlet the filter membrane has a characteristic microsieve or micromesh character. The bubble point of a filter membrane shown by FIGS. 1 to 3 is between 2 bar and 3 bar.

Figure 4:
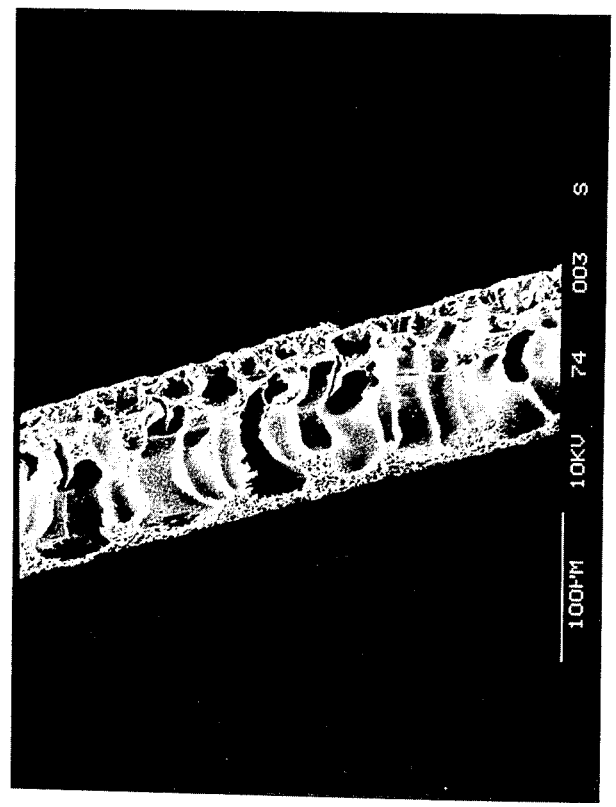
FIG. 4 is a raster electron microscopic photograph of an edge section of another membrane according to the invention.

The microfiltration membrane, an edge section of which is shown in FIG. 4, has an inner pore structure which is different from that one of a membrane according to FIGS. 1 to 3. The membrane according to FIG. 4 in its middle region has a relatively coarse open pore structure. At the underside the membrane according to FIG. 4 has a relatively thin region of an open pore structure covering the coarse middle pore structure and having pore diameters comparable with that of the membrane according to FIGS. 1 to 3. This means that the membrane according to FIG. 4 is covered at its underside by a region of open pore structure having pore diameters between 0.05 microns and 10 microns. At its upper side the membrane according to FIG. 4 is also closed or covered by a thin region of a finer structure of open pores having pore diameters between 0.05 microns and 10 microns. The membrane according to FIG. 4 has characteristic microfiltration character due to the fact that the pore openings at the underside of the membrane have the same size as the pore in the finer pore structure in the underside region of the membrane. On the other hand the pore openings at the upper side of the membrane have the same size as the pores in the thin upper side region of the membrane. Because the membrane according to FIG. 4 contains a relatively thick middle region having a coarse pore structure, this membrane has only a relatively small bubble point of about 0.7 bar.

Figure 5:
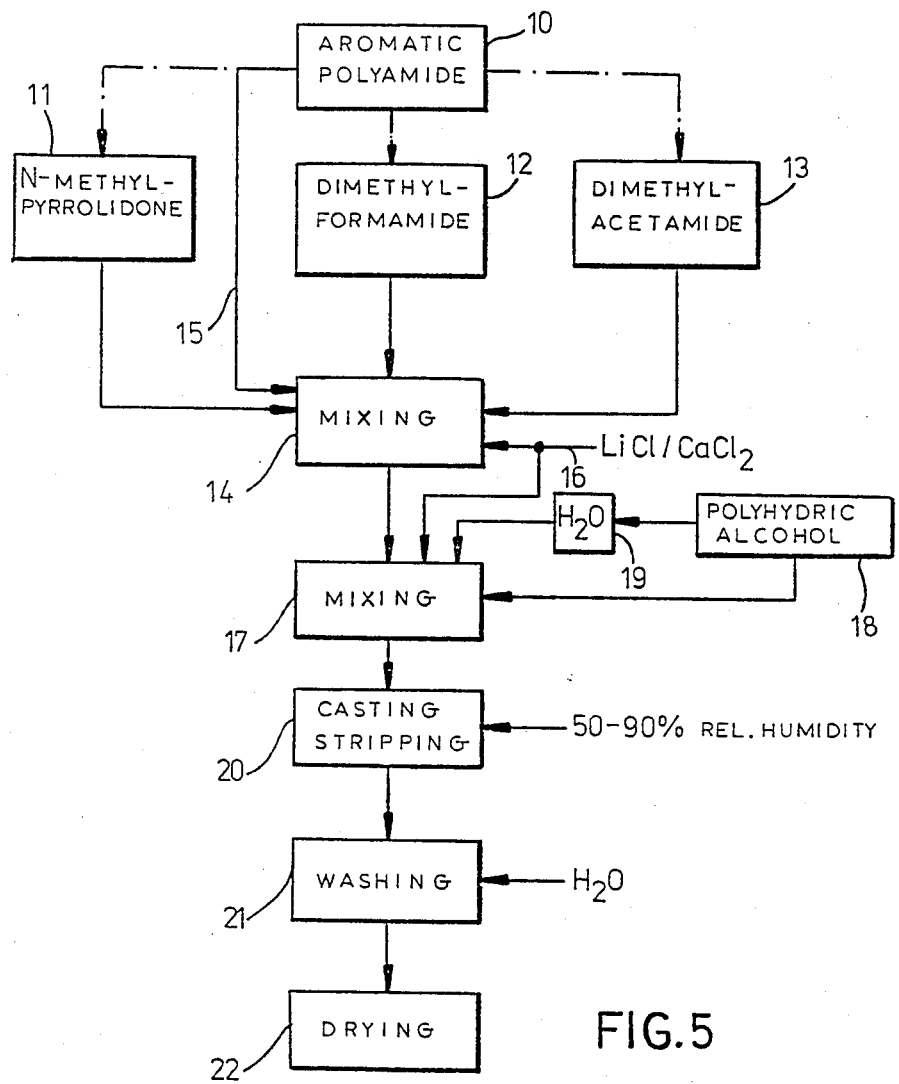
FIG. 5 is a flow diagram illustrating the method of making filter membranes as shown in FIGS. 1 to 4 and FIG. 6 is a graph showing the preferred composition of a solvent system which can be used as a basis for making filter membranes as shown in FIGS. 1 to 4.

In FIG. 5 of the drawing a flow diagram illustrative of the method for making microfiltration membranes as shown in FIGS. 1 to 4 has been provided. The aromatic polyamide at 10 can be added either to the N-methylpyrrolidone at 11, to the dimethylformamide at 12 or to the dimethylacetamide at 13 or to any combination of whichever two or more of these solvents is to form the solvent system. The solvent system is formed at 14, and as represented by the line 15, the aromatic polyamide can be added here as well. The lithium chloride or calcium chloride can be added, as represented by line 16 at this stage or in the subsequent mixing stage 17 at which the structure-loosening additive is supplied. The structure-loosening additive, the polyhydric alcohol 18 can be added directly or in combination with water as shown at 19. After intensive agitation in both of the mixing stages for a period of the order of hour in the best mode embodiment of the invention, the mixture is cast at 20 onto a smooth surface in a relative humidity of 50 to 90%. After stripping from this surface, the membrane is washed a number of times in water as represented at 21 and dried as indicated at 22

Figure 6:
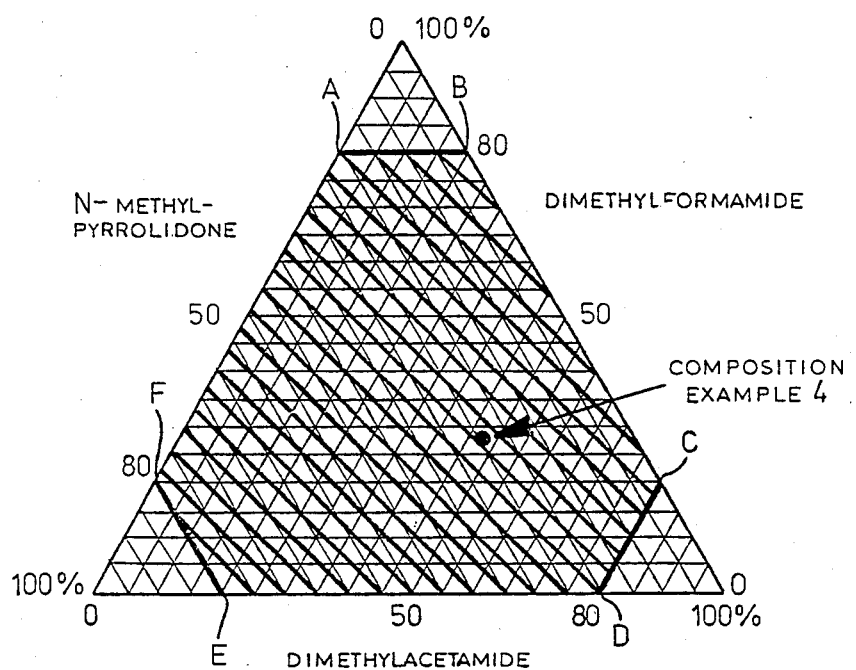

In FIG. 6 we have shown the preferred composition in a ternary diagram ofthe solvent system, the solvent system of Example 4 having been shown as a point in this diagram. The most preferable compositions lie within the region bounded by the points A, B, C, D E and F with a particularly preferred composition within the region B, C, D, E.

SPECIFIC EXAMPLES

When not otherwise identified in the following examples, the aromatic polyamide is a copolymer of m-phenylenediamine and isophthalic acid.

EXAMPLE 1

By making a solution of aromatic polyamide and in dimethylformamide and a solution of the same aromatic polyamide in dimethylacetamide, in a ratio such that the ultimate solution ratio of dimethylformamide to dimethylacetamide of 1:4 to 4:1 is obtained, and by feeding additives to the solution, it is possible to obtain high porosity membranes of exceptional permeability and high bubble point with pore sizes in the range of 0.1 micron to 10 microns. In a best mode example, 401.5 ml to dimethylformamide is used to dissolve with intensive stirring 28 grams of lithium chloride and then 70.5 grams of m-phenylenediamine/isophthalic acid copolymer. A similar mixture is made using dimethylformamide instead of dimethylacetamide.

With intensive stirring the two solvent systems are combined with intensive mixing and 40 grams of water dissolved in 60 grams of dimethylformamide and 30 grams ethylglycol dissolved in 300 grams of dimethylacetamide are added. The intensively stirred product is cast in an atmosphere with a relative humidity of 50 to 90% to a membrane having a mean pore diameter of 0.45 microns, a water permeability of 50 ml/minute/cm$^2$ with a pressure differential of 1.0 bar thereacross. The bubble point, i.e. the pressure at which the membrane passes air, was 2.2 bar.

EXAMPLE 2

Similarly excellent microfiltration membranes are made by dissolving the aromatic polyamide in a solvent system consisting of N-methylpyrrolidone and dimethylformamide with these solvents in the volume ratio of 1:4 to 4:1 and with the addition of structureloosening additives. Such membranes with a satisfactory bursting strength and a pore diameter of 0.1 microns to 3 microns can be made following Example 1 utilizing the following:

Solution 1

40.15 grams dimethylformamide
2.80 grams lithium chloride
7.05 grams m-phenylenediamine/isophthalic acid copolymer

Solution 2

40.15 grams N-methylpyrrolidone
2.80 grams lithium chloride
7.05 grams m-phenylenediamine/isophthalic acid copolymer

Additives 4.00 grams water in 6.00 grams dimethylformamide and 30.00 grams dimethylacetamide containing 30.00 grams of ethyleneglycol the membrane and a bursting strength analogous to Example 1, a similar porosity and mean pore diameter of about 2.5 microns.

EXAMPLE 3

The membranes were produced as in Example 1 and had a pore diameter in the range of 0.1 micron to 3.0 microns by mixing solutions 1 and 2 so that the solvent ratio of N-methylpyrrolidone solution to dimethylacetamide solution was 1:4 to 4:1.

Solution 1 equals:
40.15 grams dimethylacetamide
2.80 grams lithium chloride
7.05 grams m-phenylenediamine/isophthalic acid copolymer

Solution 2

40.15 grams N-methylpyrrolidone
2.80 grams lithium chloride
7.05 grams m-phenylenediamine/isophthalic acid copolymer

Additives 4 0 grams water in 6.0 grams dimethylacetamide and 30.0 grams ethyleneglycol in 30.0 grams dimethylformamide.

The mean pore size was about 2.5 microns and the permeability and bursting strength were similar to those of Example 1.

EXAMPLE 4

The same method was used with a three-solution system to yield microfiltration membranes with a pore size of 0.1 micron to 3 microns by mixing the solutions in various proportions within the ranges given.

The following solutions were used:

Solution 1

40.1 grams dimethylformamide
2.80 grams lithium chloride
7.05 grams m-phenylenediamine/isophthalic acid copolymer

Solution 2

40.15 grams dimethylacetamide
2.80 grams lithium chloride
7.05 grams m-phenylenediamine/isophthalic acid copolymer

Solution 3

40.15 grams N-methylpyrrolidone
2.80 grams lithium chloride
7 05 grams m-phenylenediamine/isophthalic acid copolymer The following additives were combined with the mixture made up of the three solutions:

6.0 grams water in 9.0 grams dimethylformamide and 45 grams ethyleneglycol in 45 grams dimethylacetamide.

The mean pore size was about 2 microns and the porosity and bursting strength were similar to those of Example 1.

In all of the examples given, after the membrane was stripped from the casting surface, it was washed many times in water to remove traces to the solvents and then dried.

When calcium chloride was substituted for the lithium chloride in the foregoing examples, similar results were obtained.

We claim:

1. A membrane filter for microfiltration, comprising a filter membrane composed of a copolymer consisting of m-phenylenediamine and isophthalic acid having an open porous structure over its entire thickness and opposite surfaces separated by the thickness of the membrane, said open porous structure opening at both of said surfaces and being formed at least adjacent to one of said surfaces with a region of minimum pore diameter in which the pore diameter is between 0.05 and 10 microns, the pore openings formed at said surfaces and leading to pores of said structure between and inwardly of said surfaces being unrestricted with respect to the pore diameter in said structure inwardly of said surfaces.

2. The membrane filter defined in claim 1 wherein said thickness is about 0.05 to about 0.15 mm.

3. A membrane filter for microfiltration, comprising a filter membrane composed of a copolymer consisting of m-phenylenediamine and isophthalic acid having an open porous structure over its entire thickness and opposite surfaces separated by the thickness of the membrane, said open porous structure opening at both of said surfaces and being substantially uniform over its entire thickness with a pore diameter over the uniform thickness between 0.05 and 10 microns, the pore openings formed at said surfaces and leading to pores of said structure between and inwardly of said surfaces being unrestricted with respect to the pore diameter in said structure inwardly of said surfaces.

4. The membrane filter defined in claim 3 wherein said thickness if about 0.05 to about 0.15 mm.

* * * * *